United States Patent [19]

Houdard et al.

[11] 4,373,151
[45] Feb. 8, 1983

[54] STOCHASTIC DEMODULATOR FOR PHASE JUMP-MODULATED SIGNALS, OPERATING IN TIME DIVIDED UP OVER SEVERAL CHANNELS

[75] Inventors: Jean-Pierre Houdard; Jean-Jacques Julie; Bernard G. Leoni, all of Colombes, France

[73] Assignee: Le Materiel Telephonique Thomson-CSF, Colombes, France

[21] Appl. No.: 138,285

[22] Filed: Apr. 8, 1980

[30] Foreign Application Priority Data

Apr. 11, 1979 [FR] France ................... 79 09147

[51] Int. Cl.³ ............................................ H04L 27/22
[52] U.S. Cl. ...................................... 329/104; 375/84
[58] Field of Search ................. 329/104, 105; 375/78, 375/82, 83, 84, 85, 86, 87

[56] References Cited

U.S. PATENT DOCUMENTS

| | | | |
|---|---|---|---|
| 3,479,457 | 11/1969 | Oswald | 375/78 |
| 3,697,881 | 10/1972 | Nakagome et al. | 329/104 |
| 3,956,623 | 5/1976 | Clark et al. | 375/82 |

FOREIGN PATENT DOCUMENTS 2337468 12/1975 France .

Primary Examiner—Ernest F. Karlsen
Attorney, Agent, or Firm—Oblon, Fisher, Spivak, McClelland & Maier

[57] ABSTRACT

The demodulator therefore features a multiplexer connected to the different transmission channels. The output of the multiplexer is connected to a sampler-coder, followed by an interpolator, which is itself followed by a phase jump converter and a statistical decision device validating the code conversion result, when a certain number of samples taken in a series of successive samples have a phase jump in the same range of values.

10 Claims, 3 Drawing Figures

STOCHASTIC DEMODULATOR FOR PHASE JUMP-MODULATED SIGNALS, OPERATING IN TIME DIVIDED UP OVER SEVERAL CHANNELS

BACKGROUND OF THE INVENTION

The present invention relates to a demodulation process for a phase jump-modulated signals (or differential phase-modulated signals) permitting processing in time divided up over a plurality of transmission channels. The present invention also relates to a demodulator for performing this process.

Demodulators of the type referred to hereinbefore are used for decoding information (called hereinafter "symbols" and having groups of two or three binary elements called "dibits" or "tribits") contained in a differential phase-modulated signal, the modulation being at 1200 or 1600 Bauds corresponding to the coding of 2400 or 4800 binary elements per second. These demodulators must be able to work in time divided up over a plurality of channels, for example 32 channels in the case where telephone lines connected to MIC systems are used for transmitting this information.

The known demodulators do not carry out a correct demodulation in all cases of use and in particular when the signals received are subject to a high noise level and/or are greatly deformed, for example due to a high distortion caused by the transmission lines. Moreover, these known demodulators require the use of an automatic gain control device.

BRIEF SUMMARY OF THE INVENTION

The present invention relates to a demodulation process of the type referred to hereinbefore permitting the correct processing of signals suffering from a high noise level and/or which are greatly deformed and the present invention also relates to a demodulator for performing this process, whereby said demodulator is constructed with the maximum simplicity and can easily be adapted to different modulating speeds of the signals received.

The demodulating process according to the invention comprises, on the basis of the modulated signals received and after a conventional sampling and coding stage, the supplying of interpolated samples in such a way that for each information symbol a whole number n of samples is obtained, calculating with respect to a fixed phase reference signal the phase deviation of each sample obtained after interpolation, comparing the thus calculated phase deviation of each sample with the phase deviation calculated in the same way for the sample preceding by n units the sample in question, the code conversion into dibits or tribits of the result of the comparison by comparing with a same phase jump value the results of different comparisons, but which are all within a same range of values, the different ranges of values being either adjoining or non-adjoining, starting a counter as soon as the results of a comparison cross a threshold, said threshold corresponding to a given number of samples taken from a series of successive samples and all belonging to the same range of values and validating the result of the code conversion as soon as the counter reaches a given state, the counter being reset whenever the crossing of a threshold has been determined for a range of values differing from that for which the count is taking place.

According to another feature of the process of the present invention, the sampled and coded signal received is interpolated in such a way that the new sampling frequency resulting from the interpolation is the smallest common multiple of the sampling frequency before interpolation and of the modulation frequency on transmission. In the case where the sampling frequency is a whole multiple of the modulating frequency, the smallest common multiple of these two frequencies is obviously the sampling frequency itself and to have an adequate number of samples per symbol interpolation takes place in such a way that after interpolation the sampling frequency is a whole multiple and advantageously three times the sampling frequency before interpolation.

According to another feature of the process of the invention, the said reference signal is generated directly by producing reference phase values in digital form at a frequency equal to that of the carrier of the transmitted data.

The demodulator for performing the process of the invention advantageously operates in time divided up over a plurality of channels and has an appropriate multiplexer followed by a conventional sampler-coder, to the output of which is connected a per se known interpolator, itself followed by a phase jump computer and by a statistical decision device.

According to a preferred embodiment of the invention the phase jump computer incorporates a calculating circuit with a non-recursive digital network and a divider for calculating the tangent of the argument of each incident signal, said calculating circuit being connected to a first read-only code conversion memory, whose output is connected to a first input of a first adder, whose second input is connected to the output of a second read-only memory controlled by an addressing counter and in which are stored reference phase values at the frequency of the carrier of the incident analog signals, the output of the first adder being connected both to a first input of a second adder and to a digital delay line incorporating a number of elements equal to the number of samples of a symbol, the output of said delay line being connected to the second input of the second adder.

According to the same preferred embodiment of the invention the statistical decision device incorporates a coding read-only memory on each of the different outputs of which appears a 1 when the phase determined by the calculating circuit is in the corresponding range of the phase deviations, each of its outputs being connected on the one hand to a read-only memory for code conversion into dibits or tribits and on the other hand to a digital delay line incorporating a number of elements which preferably exceeds 2 to 3 units at the value of said threshold, the different outputs of the elements of this delay line being connected to the different inputs of a presence probability read-only memory realised in such a way that a 1 is produced at its output when the number of elements of the corresponding digital delay line having the 1 is at least equal to the said threshold, the output of the different read-only memories being on each occasion connected on the one hand to a first series of corresponding inputs of a comparator via a first bistable multivibrator register and on the other hand to a second series of inputs of said comparators via a second bistable multivibrator register, the output of said comparator being connected on the one hand, via a logic inverter, to the timing signals input of a first bistable multivibrator which is connected to the output of the said read-only code conversion memory and on the other hand to the resetting input of a counter, whose different outputs are connected to a decoder, the output of said decoder being connected to the timing signals input of a second bistable multivibrator connected to the output of the first bistable multivibrator, the outputs of second bistable multivibrator constituting the outputs of the demodulator.

BRIEF DESCRIPTION OF THE DRAWINGS

The invention is described in greater detail hereinafter relative to a non-limitative embodiment and the attached drawings, wherein show.

DETAILED DESCRIPTION OF THE PREFERRED EMBODIMENTS

Figure 1:
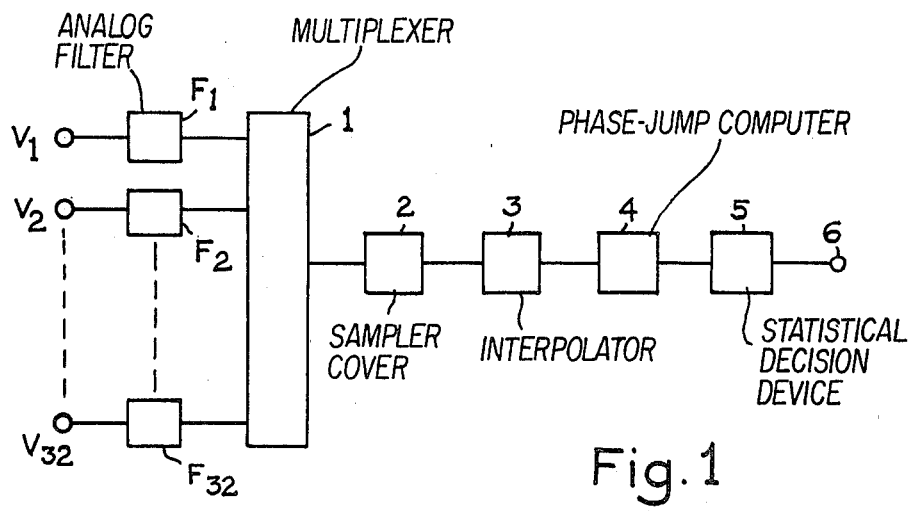
FIG. 1 a synoptic diagram of a demodulator according to the invention.

The demodulator shown in the drawings serves to demodulate phase jump-modulated signals at a frequency of 1200 Bauds (for coding 2400 binary elements per second) and transmitted by means of an 1800 Hz carrier frequency on telephone transmission channels of an MIC system for processing in time divided up over 32 channels. However, it is obvious that this demodulator can process signals modulated at a different frequency, for example 4800 or 9600 binary elements per second and transmit on carrier frequencies having different values. Decoding can also take place on a different number of transmission channels and even on a single channel, the modifications to be made being obvious to the skilled Expert.

The demodulator shown in FIG. 1 is connected to 32 not shown transmission channels arriving at terminals respectively designated by $V_1$ to $V_{32}$. Each of the these terminals is connected by means of an analog filter, $F_1$ to $F_{32}$ respectively, to an input of multiplexer 1, filters $F_1$ to $F_{32}$ being conventional band pass filters. Multiplexer 1 is followed by a sampler-coder 2 operating at a frequency of 8 kHz, itself followed by an order of three interpolator 3 permitting the passage of the 24 kHz sampling frequency. However, interpolator 3 can be of a different order, but 3 has proved to be optimum. Interpolator 3 is followed by an instantaneous phase jump computer 4 supplying for each sampling moment the corresponding phase jump value of the incident. Computer 4 is followed by a statistical decision device 5 which, at its output 6, resupplies the dibits or tribits at the modulating speed. The elements 1 to 3 are known per se and will not be described in detail. It is pointed out that elements 2 to 5 operate in time divided up over 32 channels.

Figure 2:
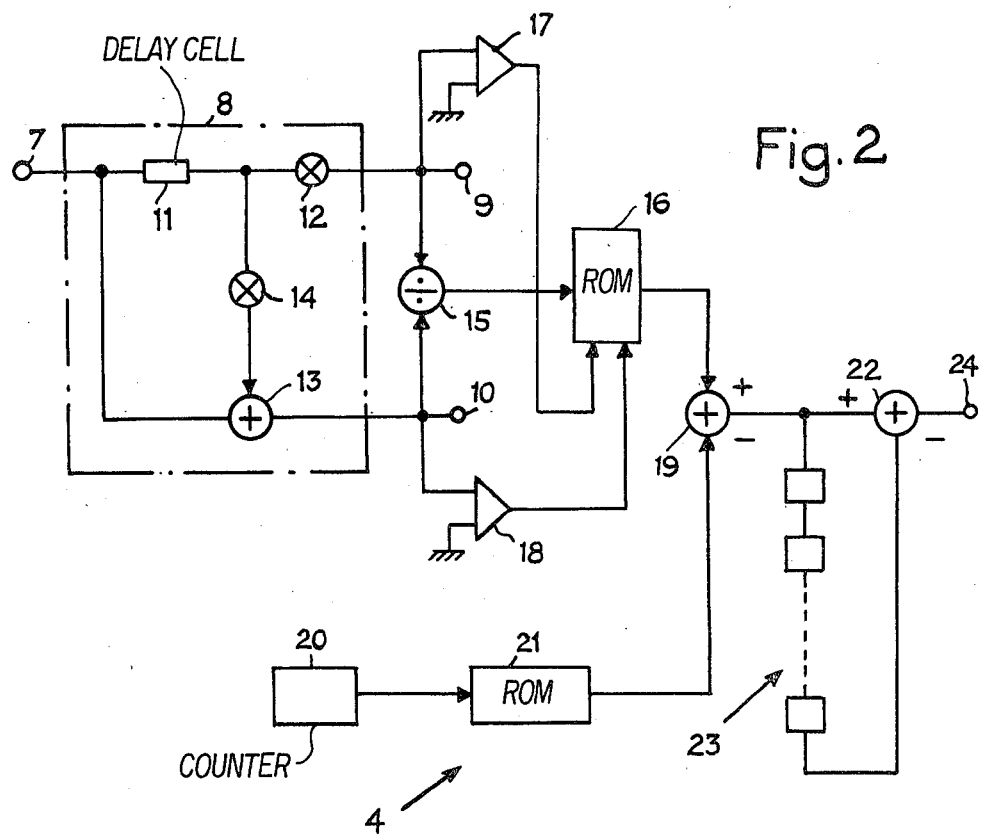
FIG. 2 a detailed block diagram of the computer of FIG. 1.

FIG. 2 shows the block diagram of a preferred embodiment of the computer 4. The input terminal 7 of computer 4 is connected to the input of a non-recursive digital network 8 having two output terminals 9, 10. Between terminals 7 and 9 the digital network 8 has a delay cell 11 in series with a first multiplier 12 by sin $\theta$ and between terminals 7 and 10 has an adder 13, the point common to the cell 11 and the multiplier 12 being connected to the adder 13 by a second multiplier 14 by $-\cos \theta$, the meaning of $\theta$ being explained hereinafter.

A divider 15 is connected between terminals 9 and 10 and its output is connected to a first address input of a read-only code conversion memory 16. Each of the terminals 9 and 10 is connected to a first input of the comparator 17, 18 respectively, the second input of said comparators being connected to earth. The outputs of comparators 17 and 18 are respectively connected to a second and a third address input of the read-only memory 16, whose output is connected to the positive input of an adder 19. A counter 20 of modulo 40 in the present case controls the sequential addressing of another read-only memory 21, whose output is connected to the negative input of adder 19, whose output is connected to the positive input of another adder 22, and to the input of a digital delay line 23 incorporating 20 elementary cells in the present case. The output of the delay line 23 is connected to the negative input of adder 22, whose output is connected to a terminal 24 constituting the output terminal of computer 4.

Figure 3:
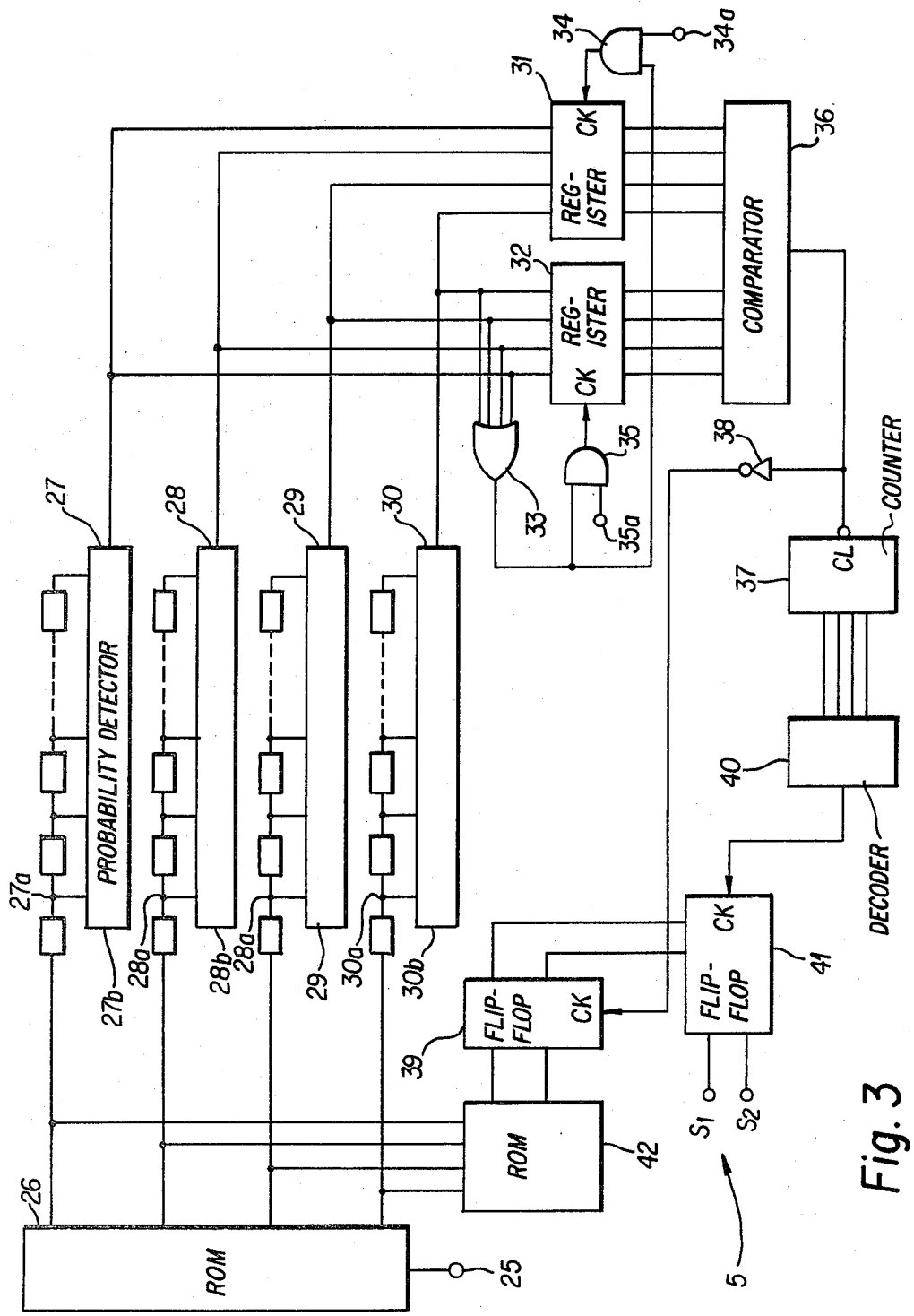
FIG. 3 a detailed block diagram of the statistical decision device of FIG. 1.

The statistical decision device shown in FIG. 3 is connected by its input terminal 25 to the output terminal 24 of the computer of FIG. 2. Terminal 25 is connected to the addressing input of a decoding read-only memory 26 having the same number of outputs as there are ranges of phase deviation values. In the present case, memory 26 has four outputs. Each of the outputs of memory 26 is connected to a presence probability detector device, respectively designating by 27, 28, 29 and 30 and all constructed in the same way. Each of the detectors 27 to 30 is constituted by a digital delay line (27a, 28a, 29a, 30a respectively) having in the present case 9 cells, the output of each of these cells being connected to an input of a presence probability read-only memory 27b, 28b, 29b, 30b respectively, the output of the read-only memory constituting the output of a corresponding presence probability detector. Each of the outputs of detectors 27 to 30 is connected both to a corresponding input of a type D flip-flop forming part of a first register 31, to a corresponding input of a type D flip-flop forming part of a second register 32 and to a corresponding input of an OR gate 33. The output of gate 33 is connected by a first AND gate 34 to the timing signals input CK of register 31 and via a second AND gate 35 to the timing signals input CK of register 32. The second input 34a of gate 34 in the same way as the second input 35a of gate 35 is connected to a not shown sequential generator supplying timing signals in the manner to be described hereinafter.

The various outputs of registers 31 and 32 corresponding to their various inputs are connected to a comparator 36 which serves to compare the configurations of the output signals of said two registers.

The output of comparator 36 is on the one hand directly connected to the resetting or zeroing input CL of a counter 37 and on the other hand via a logic converter 38 to the timing signals input CK of a type D double flip-flop 39, having in the present case two inputs and two corresponding outputs. The outputs of counter 37 are connected to a decoding circuit 40, which has decoded state 10 in the present case. The output of decoding circuit 40 is connected to the timing signals inputs CK of another type D double flip-flop 41, whereof each of the two inputs is connected to an output of the flip-flop 39 and whereof the two corresponding outputs $S_1$ and $S_2$ constitute the outputs of the demodulator according to the invention. The two inputs of flip-flop 39 are connected to corresponding outputs of a read-only memory 42 for code conversion into dibits and itself connected to the outputs of the read-only memory 26.

The operation of the demodulator described hereinbefore will now be explained and in particular the operation of computer 4 and demodulator 4, because the operation of elements 1 to 3 is known per se.

If, as stated hereinbefore, the example of a 1200 Bauds modulation is used, with the modulated signals received being sampled at 8 kHz, the same number of samples is obtained for each symbol by interpolating the thus sampled signals in such a way that the new sampling frequency after interpolation is the smallest common multiple of the sampling frequency before interpolation and of the modulating frequency on transmission, i.e. the new sampling frequency must be 24 kHz, the interpolator being of order 3. Thus, for each transmitted signal, 20 samples are obtained at the output of interpolator 3. In the case of a 1600 Bauds modulation the smallest common multiple would be 8 kHz, but there would not be sufficient samples per symbol, so that 24 kHz is used and the number of samples after interpolation is 15 per symbol, which is generally sufficient.

The signals sampled at 24 kHz are processed by the digital network 8 in the following manner. It is assumed that at a time t a sample $x_n$ appears at the input of network 8. If no account is taken of the distortions of the samples, $x_n$ is of form $x_n = A \sin(n\theta + \phi_k)$, $\phi_k$ being the instantaneous phase of $x_n$, A the amplitude of the envelope of samples and $\theta = 2\pi f_p Te'$, $f_p$ being the frequency of the carrier and $Te'$ the sampling time after interpolation. On assuming that it belongs to the same symbol as $x_n$, the delayed sample $x_{n-1}$ in cell 11 is written $x_{n-1} = A \sin[(n-1)\theta + \phi_k]$. If the signal at output 10 is called $y_{n-1}^1$ and the signal at the output 9 is called $y_{n-1}^2$ corresponding to $x_{n-}$ we obtain:

$$y_{n-1}^1 = x_n - x_{n-1} \cos \theta$$
$$= A \sin(n\theta + \Phi_k) - A \sin[(n-1)\theta + \Phi_k] \cdot \cos \theta$$
$$= A \sin \theta \cos[(n-1)\theta + \Phi_k]$$

and $$y_{n-1}^2 = x_{n-1} \sin \theta$$
$$= A \sin[(n-1)\theta + \Phi_k] \cdot \sin \theta$$

Division performed by divider 15 gives:

$$\frac{y_{n-1}^2}{y_{n-1}^1} = tg[(n-1)\theta + \Phi_k]$$

It should be noted that in the case of coding at 9600 binary elements per second, the square of the amplitude of the samples is obtained by connecting raising to the square circuits, followed by an adder to the terminals 9 and 10.

Comparators 17 and 18 make it possible to obtain the respective signs of $y_{n-1}^2$ and $y_{n-1}^1$. By storing a tangent table in the read-only memory 16 at its output the value of the argument $(n-1)\theta + \phi_k$ of sample $x_{n-1}$ is obtained.

The sequence of instantaneous phase value of a reference wave for a frequency equal to the frequency of the carrier, namely 1800 Hz in the present case is stored in the read-only memory 21. The sequence of instantaneous phase values is of form $n\theta + \phi_0$. On assuming that at each instant, the value of the arguments $n\theta + \phi_k$ of a sample of the signal received and a value $n\theta + \phi_k$ of the argument of the reference sample appear simultaneously at the inputs of adder 19 at its output is obtained the value $E_n$ of the instantaneous variation between the phase of the analysed symbol and the reference phase with $E_n = \phi_k - \phi_0$. Due to the choice of 1800 Hz for the reference phase samples and as $\theta$ is dependent on frequencies of 1800 and 8000 Hz the reference phase samples must have a periodicity of 40, i.e. the counter 20 must be of modulo 40. When the following symbol appears for which the samples are of general form $x_m = A \sin(m\theta + \phi_1)$, the instant variation $E_m$ between the phase of the symbol and the reference phase is for any value of m: $E_m = \phi_1 - \phi_0$. The phase jump $\alpha\phi_n$ between two symbols is therefore $\theta\phi_n = E_m - E_n = \phi_1 - \phi_k$ by selecting $m = n + N$, N being the number of samples per symbol in the present case $N = 20$. Consequently, at the output of adder 19, we obtain for each analysed sample the value $E_n$ or $E_m$ of the instantaneous variation between its phase and the reference phase and at the output 24 of adder 22 we obtain the value $\alpha\phi_n$ for the phase jump between two consecutive symbols, provided that the delay line 23 has N cells, N being equal to 20 in the present case.

The value of $\Delta\phi_n$ calculated for each incident sample by computer 4 is transmitted into the decoding read-only memory 26 supplying a 1 on one of its outputs when the instant $\Delta\phi_n$ is in the corresponding range of deviations and 0 on the other outputs, the ranges being advantageously adjoining. For each incident sample, the signals appearing at each of the outputs of memory 26 are transmitted into digital delay lines or shift registers 27a to 30a where they advance step by step on each arrival of a new sample. In the present case, the delay lines have 9 cells, which means that at any moment it is possible to know the phase values of the 9 all last samples. Each of the read-only memories 27b to 30b is constructed so as to produce a 1 at its output as soon as at least 7 of the 9 values stored in the corresponding delay line are equal to 1. Thus, as soon as at least 7 of the 9 consecutive samples have a phase in the same common range, one of the outputs of the presence probability memories is at 1 and all the others are at 0. This configuration of the memory outputs is again encountered at the input of the OR gate 33, which thus has a 1 at its output. Registers 31, 32 can only transmit this configuration at their respective outputs when 1 appears on terminals 34a and 35a. A not shown, known sequential generator firstly transmits a 1 to terminal 35a and at the end of a sufficient time after the arrival of the first sample of a symbol in order to ensure decoding and to permit the presence probability determination device to transmit a 1 at its output. This is followed by the counting and decision treatment described hereinafter, at the end of which the sequential generator transmits a 1 to terminal 34a. During this processing, terminal 34a is still at 0 and flip-flops 31 thus have the configuration corresponding to the preceding symbol at its outputs. Thus, after the appearance of a 1 on terminal 35a, comparator 36 can determine whether the output configuration of the register 31 is or is not the same as that of register 32, comparator 36 being constructed so as to have a 1 at its output when these two configurations are identical and an 0 when they differ. Thus, counter 37 is reset when these two configurations differ.

However, due to the presence of the OR circuit 33 the untimely resetting of counter 37 is prevented. Thus, during the arrival of successive samples of the same symbol, assumed to be different from the preceding symbol, the output of one of the presence probability detectors produces a 1 which persists during the arrival of one or more samples and then returns to 0, without the output of another detector passing to 1 during a certain time. It is possible to assume with a high degree of probability that the symbol, whose first samples made the output of one of the detectors pass to 1 has in fact the corresponding phase jump. Moreover, register 31 has stored a configuration incorporating a 1 for the preceding symbol and as soon as the 1 appears at the output of the detector in question for the symbol being received, the comparator 36 resets the counter 37, but the configuration only having 0, due to the fact that the output of the detector in question passed to 0 again, although different from the configurations stored in register 31, cannot reach comparator 36, because an 0 is present at the output of the OR gate 33 and blocks gates 34 and 35.

As soon as an 0 appears at the output of comparator 36, it resets the counter 37, as defined hereinbefore and it is transformed into a 1 by inverter 38. The passage to 1 at the output of 38 applied to the inputs CK of flip-flop 39 transfers into the latter the information decoded by code converter 42, i.4. the dibit corresponding to the phase jump having been detected by the presence probability detector according to the process described hereinbefore. Moreover, for each new incident sample, as soon as device 5 has established that it is a sample belonging to the same symbol as the previous sample, either because a 1 is maintained at the output of the corresponding detector or because a 1 does not appear at the outputs of the other detectors, counter 37 is incremented by one unit. At its output, the state decoder 48 transmits a 1 as soon as counter 37 arrives at a predetermined state, advantageously equal to approximately half the number of samples of a symbol, 10 in the present case. The passage to 1 of the output of decoder 40 brings about the transfer to the outputs $S_1$ and $S_2$ of flip-flop 41 of the dibit which has been stored in 39 under the control of the 0 transmitted by comparator 36 in the manner described hereinbefore. Thus, as soon as the seventeenth sample of a signal arrives (zeroing of counter 37 possible as from the seventh sample and transferred to the outputs of the flip-flop 41 10 samples later) the dibit can be present at outputs $S_1$ and $S_2$ with a high degree of certainty.

What is claimed is:

1. A demodulation process for phase jump-modulated signals, in particular for the processing in time divided up over a plurality of transmission channels, comprising the steps of:
    sampling and coding said signals on reception;
    interpolating said sampled and coded signals in such a way as to obtain a whole number n of samples for each information symbol;
    comparing with a fixed reference signal the phase deviation of each sample obtained after interpolation is calculated, wherein the thus calculated phase deviation of each sample is compared with the phase deviation calculated in the same way for the sample preceding the sample under consideration by n units;
    code converting the result of the said comparison by comparing with a phase jump value having different comparison results, but which are in a same range of values;
    starting a counter when the results of said comparison cross a threshold with said threshold corresponding to a given number of samples taken from a series of successive samples and all belonging to the same range of values; and
    validating the result of said comparison when said counter reaches a given state to thereby output a demodulated signal.

2. A process according to claim 1, wherein the counter is reset whenever the crossing of a threshold has been determined for a range of values differing from that for which the count is taking place.

3. A process according to claim 1 or 2, wherein the sampled and coded signal received is interpolated in such a way that the new sampling frequency resulting from the interpolation is the smallest common multiple of the sampling frequency before interpolation and the modulating frequency on transmission.

4. A process according to claims 1 or 2, wherein the sampled and coded signal received is interpolated in such a way that the new sampling frequency resulting from the interpolation is a whole multiple, advantageously three times the sampling frequency before interpolation, the latter being a whole multiple of the modulating frequency.

5. A process according to claim 1, wherein said reference signal is generated by directly producing in digital form reference phase values at a frequency equal to that of a carrier of the said transmitted data.

6. A demodulator for processing phase jump-modulation intended to operate in time divided up over a plurality of channels comprising; a multiplexer, a sampler-coder connected to the output of said multiplexer, an interpolator connected to the output of said sampler-coder, a phase jump computer for receiving the output of said interpolator and a statistical decision device connected to the output of said computer.

7. A demodulator according to claim 6, wherein the phase jump computer comprises a calculating circuit with a non-recursive digital network and a divider for calculating the tangent of the argument of each incident signal, said calculating circuit being connected to a first read-only code conversion memory, whose output is connected to a first input of a first adder, whose second input is connected to the output of a second read-only memory controlled by an addressing counter and in which are stored reference phase values at the frequency of the carrier of the incident analog signals, the output of the first adder being connected both to a first input of a second adder and to a digital delay line incorporating a number of elements equal to the number of samples of a symbol, the output of said delay line being connected to the second input of the second adder.

8. A demodulator according to either of the claims 6 and 7, wherein the statistical decision device comprises a coding read-only memory on each of the different outputs of which appears a 1 when the phase determined by the calculating circuit is in the corresponding range of the phase deviations, each of its outputs being connected on the one hand to a read-only memory for code conversion into dibits or tribits and on the other hand to a digital delay line incorporating a number of elements which preferably exceeds 2 to 3 units at the value of said threshold, the different outputs of the elements of this delay line being connected to the different inputs of a presence probability read-only memory realised in such a way that a 1 is produced at its output when the number of elements of the corresponding digital delay line having the 1 is at least equal to the said threshold, the output of the different read-only memories being on each occasion connected on the one hand to a first series of corresponding inputs to a comparator via a first bistable multivibrator register and on the other hand to a second series of inputs of said comparators via a second bistable multivibrator register, the output of said comparator being connected on the one hand, via a logic inverter, to the timing signals input of a first bistable multivibrator which is connected to the output of the said read-only code conversion memory and on the other hand to the resetting input of a counter, whose different outputs are connected to a decoder, the output of said decoder being connected to the timing signals input of a second bistable multivibrator connected to the output of the first bistable multivibrator, the outputs of second bistable multivibrator constituting the outputs of the demodulator.

9. A process according to claim 1 or 2 wherein the result of said code conversion is in the form of dibits.

10. A process according to claim 1 or 2 wherein the result of said code conversion is in the form of tribits.

* * * * *